United States Patent [19]
Turnbull et al.

[11] Patent Number: 5,956,012
[45] Date of Patent: Sep. 21, 1999

[54] SERIES DRIVE CIRCUIT

[75] Inventors: Robert Ralph Turnbull; Frederick Thomas Bauer; Peter William Vanderwel, all of Holland, Mich.

[73] Assignee: Gentex Corporation, Zeeland, Mich.

[21] Appl. No.: 08/825,768

[22] Filed: Apr. 2, 1997

[51] Int. Cl.[6] .................................................. G06F 3/14
[52] U.S. Cl. ........................... 345/105; 345/49; 327/108; 327/331; 327/540
[58] Field of Search ..................................... 345/105, 211, 345/212, 49; 349/16; 359/265–279; 327/108, 109, 309, 327, 328, 331, 540, 541

[56] References Cited

U.S. PATENT DOCUMENTS

| | | | |
|---|---|---|---|
| 4,057,739 | 11/1977 | Otake | 345/105 |
| 4,117,475 | 9/1978 | Ebihara et al. | 345/105 |
| 4,201,985 | 5/1980 | Inami et al. | 345/105 |
| 4,217,579 | 8/1980 | Hamada et al. | 345/49 |
| 4,295,138 | 10/1981 | Nakauchi et al. | 345/105 |
| 4,902,108 | 2/1990 | Byker . | |
| 5,193,029 | 3/1993 | Schofield et al. . | |
| 5,424,898 | 6/1995 | Larson et al. . | |
| 5,451,822 | 9/1995 | Bechtel et al. . | |
| 5,486,952 | 1/1996 | Nagao et al. . | |
| 5,550,677 | 8/1996 | Schofield et al. . | |
| 5,581,406 | 12/1996 | Kobayashi et al. . | |

Primary Examiner—Mark K. Zimmerman
Assistant Examiner—Vincent E. Kovalick
Attorney, Agent, or Firm—Fitch, Even, Tabin & Flannery

[57] ABSTRACT

A series drive circuit for driving a plurality of serially-connected electronic elements, such as electrochromic elements. The series drive circuit maintains a accurately controlled voltage across each of the electronic elements, while reducing power consumption and current consumption. A constant voltage is applied to the serially-connected electronic elements that is the sum of the required voltage for each of the electronic elements. In order to prevent excess voltage across any of the elements, shunts are connected in parallel with each of the elements. In order to reduce excess voltage across any of the elements, the voltage across each of the elements is monitored and used to control the shunts to maintain a accurately controlled voltage across each of the serially-connected electronic elements.

17 Claims, 2 Drawing Sheets

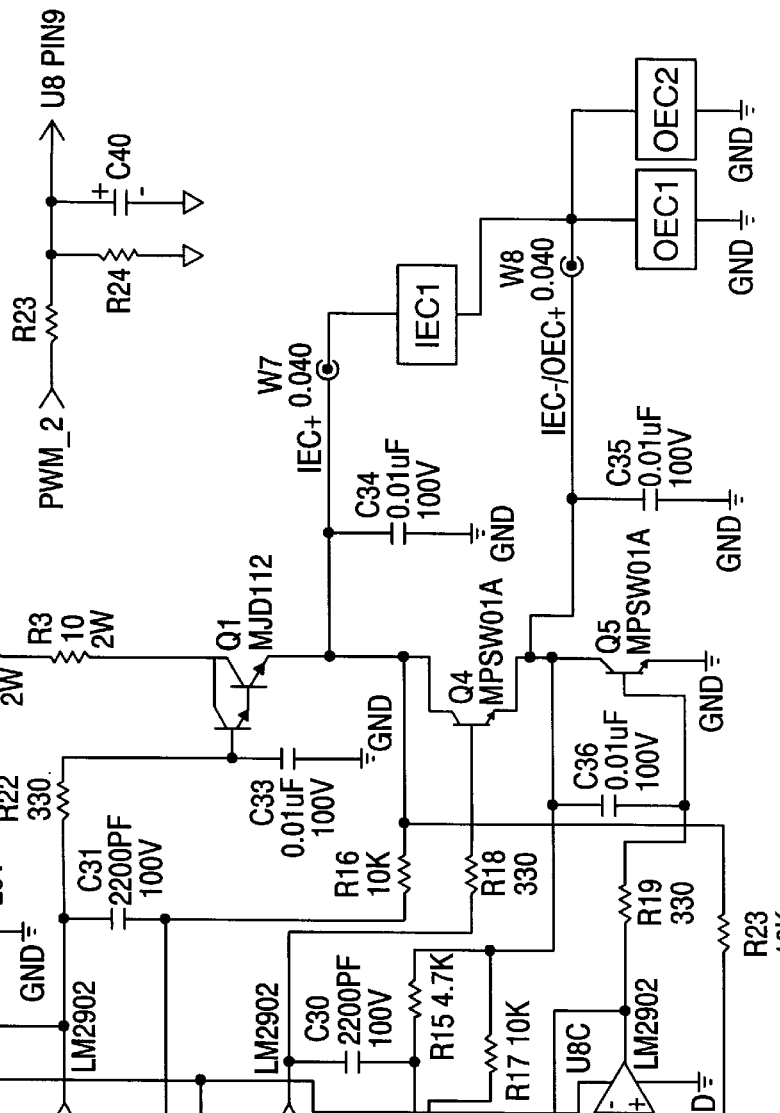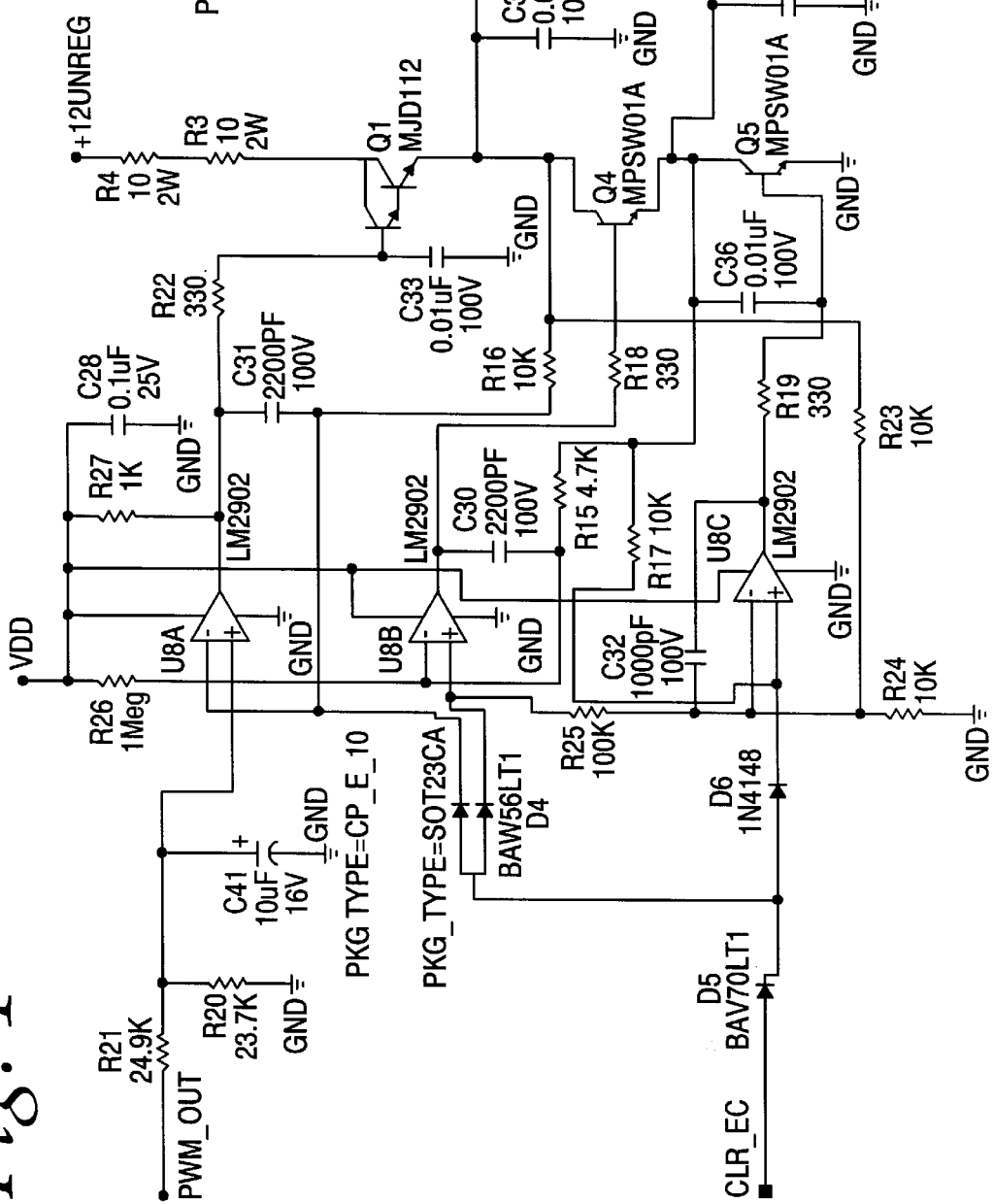

5,956,012

SERIES DRIVE CIRCUIT

BACKGROUND OF THE INVENTION

1. Field of the Invention

The present invention relates to an electronic circuit for driving a plurality of serially-connected elements and more particularly, to a series drive circuit for driving a plurality of serially-connected electronic elements, such as electrochromic mirrors or electrochromic windows, and maintaining a relatively a accurately controlled voltage across each electronic element while minimizing power dissipation.

2. Description of the Prior Art

Variable electrochromic mirror and window systems (hereinafter "electrochromic elements") are generally known in the art. Such systems normally include a plurality of electrochromic elements. For example, in an automotive application, electrochromic elements are known to be used for both the rearview mirror and one or more of the sideview mirrors or window applications for sun load control. It is known that the reflectance of an electrochromic element is a function of the voltage applied to the electrochromic element, for example, as generally described in U.S. Pat. No. 4,902,108 assigned to the same assignee as the assignee of the present invention and hereby incorporated by reference. Because of this characteristic, such electrochromic elements are known to be used to automatically control glare from external light sources in various automotive and other applications. In such applications, a plurality of electrochromic elements are controlled. More particularly, in some known systems the electrochromic elements are known to be generally connected in parallel and sourced from a common source of electric power. The drive circuit may be powered from a 12 V, 8 V or 5 V. In an automotive application, the 12 volt vehicle battery is used as the electrical power source for the electrochromic elements. The actual element voltages are less than 1.5 V. Since the actual element voltages are low compared to the supply voltage, multiple elements may be connected in series to provide multiple element drive with current consumption equivalent to a single element to reduce power dissipation in the drive circuitry.

In order to prevent damage to such electrochromic elements and actually control reflectance of the various elements, the voltage across each element must be controlled. Unfortunately, it is relatively difficult to dissipate the required power in a small area, such as inside an automatic mirror, with multiple electrochromic elements in a parallel configuration, as discussed above. In particular, it is known that the effective resistance of the electrochromic elements varies as a function of part-to-part variations in the electrochromic elements. It is also known that the resistance of the electrochromic elements may vary as a function of temperature. In applications where the electrochromic elements are used both inside and outside the vehicle, the temperature difference between the inside and outside electrochromic elements can be relatively significant. In applications where the electrochromic elements are connected in parallel, the electrical current, and thus, power consumption of the various electrochromic elements can vary significantly.

Previous attempts have been made to resolve the problem of power dissipation discussed above. In one known previous attempt, the various electrochromic elements were connected in series and driven from a common source of electrical power. Unfortunately, in that known attempt, it was relatively difficult to control the voltage across each of the electrochromic elements in order to prevent damage and accurately control reflectance.

SUMMARY OF THE INVENTION

It is an object of the present invention to solve various problems in the prior art.

It is yet another object of the present invention to provide an series drive circuit for driving a plurality of electronic devices.

It is yet a further object of the present invention to provide a series drive circuit for driving a plurality of electronic elements while maintaining a accurately controlled voltage across each of the electronic elements.

It is yet another object of the present invention to provide a series drive circuit for driving a plurality of serially-connected electronic elements while minimizing power dissipation in the driving circuit.

Briefly, the present invention relates to an series drive circuit for driving a plurality of serially-connected electronic elements, such as electrochromic elements. The series drive circuit maintains an accurately controlled constant voltage across each of the electronic elements, thus reducing power consumption and current consumption. A constant voltage is applied to the serially-connected electronic elements that is the sum of the required voltage for each of the electronic elements. In order to prevent excess voltage across any of the elements, shunts are connected in parallel with each of the elements. The voltage across each of the elements is monitored and used to control the shunts to maintain a relatively accurately controlled voltage across each of the serially-connected electronic elements.

BRIEF DESCRIPTION OF THE DRAWINGS

These and other objects of the present invention will be relatively understood with reference to the following specification and attached drawing or in FIG. 1, wherein:

FIG. 1 is a schematic diagram of the series drive circuit in accordance with the present invention;

DETAILED DESCRIPTION OF THE PREFERRED EMBODIMENT

Figure 2:
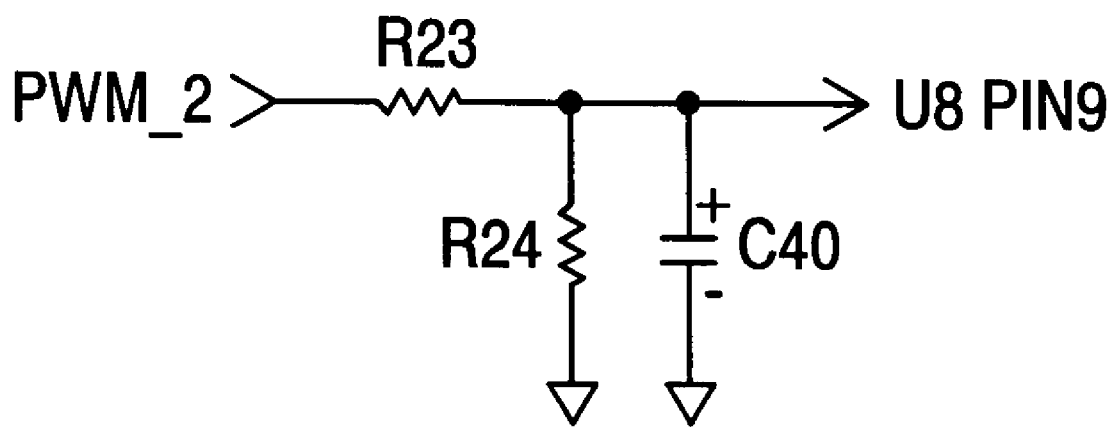
FIG. 2 is a schematic diagram of an alternative embodiment of the invention illustrated in FIG. 1.

The present invention relates to a series drive circuit for driving a plurality of serially-connected of electronic elements which maintains a relatively constant voltage across each of the electronic elements, while reducing voltage of the individual electronic elements due to part-to-part variations and variations due to temperature fluctuations. For simplicity, the series drive circuit in accordance with the present invention, is illustrated and described in connection with electrochromic mirror and electrochromic window systems. However, as will be appreciated by those of ordinary skill in the art, the present invention may be used for various types of systems where the voltage and power dissipation of a plurality of electronic elements needs to be controlled.

Referring to FIG. 1, the system is illustrated and described for controlling an inside electrochromic mirror (IEC1) for use as a rearview mirror and one or more outside electrochromic mirrors (OEC1, OEC2) used for sideview mirrors in an automotive application. In accordance with the present invention, the inside electrochromic element (IEC1) is connected in series with one or more parallel connected outside electrochromic elements (OEC1, OEC2). Although the invention is illustrated and described with just two serially-connected electrochromic elements, the principles of the present invention are applicable to configurations in which three or more electrochromic elements or electronic elements are connected in series.

The electrochromic elements (IEC1, OEC1, OEC2) and generally described in detail in U.S. Pat. No. 4,902,108 assigned to the same assignee as the present invention and hereby incorporated by reference. As mentioned above, the reflectance of such electrochromic elements (IEC1, OEC1, OEC2) is a function of the voltage across each of the elements. Electrochromic elements as described in the aforementioned patent are adapted to be typically controlled between 0 and 1.2 volts. Thus, for the exemplary system illustrated in FIG. 1 with one inside electrochromic element (IEC1) serially connected to a pair of parallel connected outside electrochromic elements (OEC1, OEC2), the full scale voltage for the serial combination is 2.4 volts at the node identified as IEC+. As will be discussed in more detail below, the voltage at the node IEC+ is compared with the output voltage of a digital to analog converter (DAC) which forms a feedback loop in order to maintain a relatively constant voltage at the node (IEC+) as a function of the output of the DAC. Shunt devices implemented as shunt transistors Q4 and Q5 are connected in parallel across the serially-connected electrochromic devices IEC1, OEC1, OEC2. The voltage at the node IEC-/OEC+ (i.e., the junction between the inside and outside electrochromic elements (IEC1, OEC1, OEC2)) is monitored to maintain the voltage across each of the serially-coupled devices IEC1, OEC1, OEC2 as a predetermined fraction of the voltage at the node IEC+. Should the voltage across either of the serially-connected electrochromic elements IEC1, OEC1, OEC2 vary, the shunt devices Q4 and Q5 are used to either shunt current or source current to the electrochromic devices IEC1, OEC1, OEC2 such that the voltage across each of the electrochromic elements IEC1, OEC1, OEC2 is a predetermined fraction of the voltage at the node IEC+. The shunt transistors Q4 and Q5 are also used to short, and thereby clear, the inside and outside electrochromic elements IEC1, OEC1, OEC2. Electrical power for the inside and outside electrochromic elements IEC1, OEC1, OEC2 may be provided by a twelve volt unregulated power supply, for example, provided by the vehicle battery. A power transistor, for example a Darlington pair, Q1, configured as an emitter follower is used to drive the inside and outside electrochromic elements IEC1, OEC1, OEC2. In order to reduce the collector voltage of the power transistor Q1 and thus its power dissipation, a pair of serially-connected resistors R3, R4 are connected between an unregulated voltage source and the collector of the power transistor Q1. The emitter of the power transistor Q1 is connected to the node IEC+.

As mentioned above, the node voltage IEC+ is ideally controlled between 0 and 2.4 volts allowing for 1.2 volts for the inside electrochromic element IEC1, and 1.2 volts for the one or more of the outside electrochromic elements OEC1 and OEC2. The node voltage IEC+ is applied to the inverting input of an operational amplifier U8A by way of a resistor R16. The node voltage IEC+ is compared with the scaled output of the DAC converter. In particular, the DAC is implemented as a pulse with modulator (PWM) output of a five volt microprocessor. This 5 volt output is scaled by a voltage dividing network which includes the resistors R20 and R21 to scale the 0–5 volt output of the DAC to 0–2.4 volts. This scaled DAC output of 0–2.4 volt is applied to a non-inverting input of the difference amplifier U8A and compared with the node voltage IEC+. Since the DAC is implemented as a PWM, a capacitor C41 is connected between the non-inverting input and ground to average the PWM output signal to a DC value. The output of the difference amplifier U8A is connected to the base of the power transistor Q1 forming a closed feedback loop in order to maintain the voltage at the node IEC+ generally equal to the scaled value of the DAC output.

The resistor R16 in combination with a capacitor C31, connected between the output and the inverting input of the difference amplifier U8A forms a low pass filter used to stabilize the feedback loop. A resistor R22 and a capacitor C33 connected between the output difference amplifier U8A and the power transistor Q1 also form a low pass filter, used for stabilizing the feedback loop around the power transistor Q1.

In order to increase the drive voltage available at the output of a difference amplifier U8A, a pull up resistor R27 may be connected between the difference amplifier U8A and a five volt power supply VDD. A bypass capacitor C28 may be connected between the power supply VDD and ground to stabilize the output of the difference amplifier U8A.

As mentioned above, the shunt transistors Q4 and Q5 are used to balance the voltage across the inside electrochromic element IEC1 and the one or more electrochromic elements OEC1 and OEC2. As shown, if the voltage across the one or more outside electrochromic elements OEC1, OEC2 exceeds a predetermined fraction of the voltage applied to the node IEC+, the shunt transistor Q5 is turned on to balance the voltage. The predetermined fraction is set by the voltage divider circuit which includes the resistors R23 and R24. The values of these resistors R23 and R24 are selected to provide a predetermined fraction of the node voltage IEC+ which is compared with the node voltage for the outside element IEC-/OEC+. For electrochromic mirrors, the predetermined fraction may be selected as 50%. In other words, the voltage across the inside electrochromic element IEC1 is equal to the voltage across the one or more outside electrochromic elements OEC1, OEC2. However, in the case of electrochromic mirror elements used in motor vehicles with window glass of different transmissivities, the fraction for the side and rear windows may differ, for example, 70% for side windows and 30% for rear window.

In the present application for electrochromic mirrors, the voltage across the inside electrochromic element IEC1 and the one or more outside electrochromic elements OEC1, OEC2 across each elements is maintained at 1.2 volts. Thus, in such an application, the resistance values R23 and R24 are selected with equal value so that one-half or 50% of the voltage applied to the node IEC+ is compared with the node voltage across the one or more outside electrochromic elements OEC1, OEC2. In particular, the predetermined fractional portion of the sum voltage available at the node IEC+ is applied to an inverting input of a difference amplifier U8C by way of the resistor R23. The node voltage IEC-/OEC+ representative of the voltage across the one or more outside electrochromic elements OEC1, OEC2, is applied to a non-inverting input of the difference amplifier U8C by way of a resistor R17. The output of the difference amplifier U8C is applied to the base of the shunt transistor Q5 forming a feedback loop. Any time the voltage across one of the outside electrochromic elements OEC1, OEC2 exceeds a predetermined fraction of the sum voltage at the node IEC+, the output of the difference amplifier U8C causes the transistor Q5 to turn on, thereby shunting current around the outside electrochromic elements OEC1 and OEC2 until the voltage around the outside electrochromic elements OEC1, OEC2 is at a predetermined fraction of the sum voltage applied to the node IEC+.

A resistor R19, connected between output of the difference amplifier U8C and the base of the shunt transistor Q5, and a pair of capacitors C32 and C36 may be used stabilize the feedback loop around the shunt transistor Q5. The capacitor C36 is connected between the collector and base of the shunt transistor Q5 while the capacitor C32 is connected between the output and the inverting input of the difference amplifier U8C.

Should the voltage across the one or more outside electrochromic elements OEC1, OEC2 be too low, the shunt transistor Q4, connected in parallel across the inside electrochromic element IEC1, is used to shunt current around the inside electrochromic element IEC1 to provide additional current to the one or more outside electrochromic elements OEC1, OEC2, thus raising their voltage. In this case, the fractional portion of the node voltage IEC+ is compared with the voltage across one or more of the outside electrochromic elements OEC1, OEC2 plus an offset. The offset, for example, 50 millivolts, is used to prevent both of the shunt transistors Q4 and Q5 from operating at the same time to reduce power dissipation. The fractional portion of the node voltage IEC+ is applied to an inverting input of the difference amplifier U8B by way of a resistor R15. An offset, for example, 50 millivolts, is also applied to the inverting input of the difference amplifier U8B. The offset is provided by the combination of resistors R15 and R26 connected between the power supply VDD and the inverting input of the difference amplifier U8B. The fractional portion of the node voltage IEC+ is applied to a non-inverting input of the difference amplifier U8B by way of the resistors R23 and R25. Any time the voltage across the one or more outside electrochromic elements OEC1, OEC2 plus the offset falls below the predetermined fraction of the node voltage IEC+, the difference amplifier U8B will turn the shunt transistor Q4 on to shunt current around the inside electrochromic element IEC1 to one or more of the outside electrochromic elements OEC1, OEC2 to increase their voltage.

In order to stabilize the feedback loop around the shunt transistor Q4, a resistor R13 and a capacitor C30 are used. The resistor R15 is connected between the emitter of the shunt transistor Q4 and the inverting input of the difference amplifier U8B. The capacitor C30 is connected between the output and the inverting input of the difference amplifier U8B.

The shunt transistors Q4 and Q5 are also used to short and thus, clear the inside electrochromic element IEC1 and the one or more electrochromic elements OEC1, OEC2. A clear signal CLR__EC is used for controlling the clearing of the inside of the electrochromic element IEC1 and the one or more outside electrochromic elements OEC1, OEC2. The clear signal CLR__EC is applied to the non-inverting inputs of the difference amplifiers U8B and U8C and the inverting input of the difference amplifier U8A by way of the diodes D4 and D6. When the clear signal CLR__EC is high, the non-inverting inputs at the difference amplifiers U8B and U8C as well as the inverting input at the difference amplifier U8A are driven high overriding the voltages established by the feedback. The resistors R17 and R25 are used to provide high impedance feedback to the non-inverting terminals of the difference amplifiers U8B U8C. When the clear signal CLR__EC is high, the output of the difference amplifier U8A is driven low, which, in turn, turns off the drive transistor Q1. The clear signal CLR__EC also forces the outputs of a difference amplifiers U8B and U8C to go high, which in turn, turn on the shunt transistors Q4 and Q5 to perform element shorting. When the clear signal CLR__EC goes low, the diodes D4 and D6 are reversed biased allowing the driver to operate in a non-shorting mode.

In an alternate embodiment of the invention as partially illustrated in FIG. 2, the circuit is slightly modified to enable the circuit to be used for motor vehicles with different transmissivities for the side and rear windows. In such an application, the circuit may be modified by disconnecting the resistor R23 from the emitter of the drive transistor Q1 and connecting it directly to the DAC output. Such a modification will enable each of the electrochromic elements connected to the nodes IEC+ and IEC−/OEC+ to be independently controlled. In such a application, a capacitor C40 may be connected in parallel across the resistor R24 to average the PWM output signal to a DC level.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A series drive circuit for driving a plurality of serially-connected predetermined electronic elements, the series drive circuit comprising:

a power transistor connected to said serially-connected electronic elements for providing a first predetermined voltage equal to the voltages across the serially-connected electronic elements;

a power transistor feedback loop for said power transistor for controlling said power transistor to maintain said predetermined voltage across said serially-connected electronic elements;

a plurality of shunt devices, each shunt device connected across one of said serially-connected electronic elements; and a feedback loop for each of said shunt devices for controlling the voltage across each of said serially-connected electronic devices.

2. The series drive circuit as recited in claim 1, wherein said power transistor feedback loop includes a difference amplifier for comparing said first predetermined voltage applied across said serially-connected electronic elements with a second predetermined voltage in order to control said drive transistor to maintain said first predetermined voltage.

3. The series drive circuit recited in claim 1, further including means for maintaining an equal voltage across each of the serially-connected electronic elements.

4. The series drive circuit as recited in claim 1, further including means for maintaining the voltage across said serially-connected electronic elements as a predetermined fraction of said first predetermined voltage.

5. The series drive circuit as recited in claim 1, further including means for preventing said plurality of shunt devices from operating at the same time during predetermined conditions.

6. The series drive circuit as recited in claim 1, further including means for shunting all of said serially-connected electronic devices under the control of a predetermined control signal.

7. A series drive circuit for driving a plurality of serially-connected electronic elements, the series drive circuit comprising:

means for providing a first predetermined voltage across all of said serially-connected electronic elements; and means for controlling the voltage across each of said serially-connected electronic devices.

8. The series drive circuit as recited in claim 7, wherein said controlling means includes a plurality of shunt devices configured such that a shunt device is connected across each of said serially-connected electronic devices.

9. The series drive circuit as recited in claim 7, wherein said controlling means includes means for controlling the voltage across each of said predetermined serially-connected electronic to be a predetermined fraction of said first predetermined voltage.

10. A series drive circuit for driving a plurality of serially-connected predetermined electronic elements including a first element and a second element, the series drive circuit comprising:

means for providing a predetermined overall voltage across said plurality of serially connected elements; and means for controlling the voltage across said first electronic element to be a predetermined fraction of said predetermined overall voltage.

11. The series drive circuit as recited in claim 10, wherein said controlling means includes means for maintaining the voltages across each of said plurality of serially connected electronic elements to be equal.

12. The series drive circuit as recited in claim 10, wherein said controlling means includes means for maintaining the voltage across one of said plurality of serially connected elements to be different than another one of said serially connected electronic elements.

13. The series drive circuit as recited in claim 10, wherein said controlling means includes one or more shunts.

14. The series drive circuit as recited in claim 13, wherein at least one of said one or more shunts is connected in parallel across one of said serially connected electronic elements.

15. The series drive circuit as recited in claim 10, wherein at least one of said serially connected electronic elements is an electrochromic element.

16. The series drive circuit as recited in claim 15, wherein said electrochromic element is an electrochromic mirror.

17. The series drive circuit as recited in claim 15, wherein said electrochromic element is electrochromic glass with variable transmissivity.

* * * * *

UNITED STATES PATENT AND TRADEMARK OFFICE
CERTIFICATE OF CORRECTION

PATENT NO. : 5,956,012
DATED : September 21, 1999
INVENTOR(S) : Turnbull, et al.

It is certified that error appears in the above-identified patent and that said Letters Patent is hereby corrected as shown below:

Column 7, line 4; after "electronic" insert --elements--.

Column 7, line 11; after "connected" insert --electronic--.

Column 8, lines 1 and 2; after "connected" insert --electronic--.

Signed and Sealed this

Ninth Day of May, 2000

Attest:

Q. TODD DICKINSON

*Attesting Officer*     *Director of Patents and Trademarks*